United States Patent [19]
Martin

[11] Patent Number: 5,483,990
[45] Date of Patent: Jan. 16, 1996

[54] IN-LINE VALVE FOR INSERTION IN A PRESSURIZED FLUID FLOW LINE

[75] Inventor: Joseph R. Martin, Newport, Ky.

[73] Assignee: Jomar International, Ltd., Madison Heights, Mich.

[21] Appl. No.: 429,865

[22] Filed: Apr. 27, 1995

[51] Int. Cl.⁶ .................... F16K 43/00; F16L 55/128
[52] U.S. Cl. ................... 137/318; 30/93; 138/89; 138/94; 138/97; 408/67; 408/72 R; 408/83; 408/101
[58] Field of Search .................... 30/93; 83/835; 137/15, 315, 318, 321; 138/89, 93, 94, 94.3, 97; 408/67, 72 R, 83, 101, 204, 207

[56] References Cited

U.S. PATENT DOCUMENTS

| | | | |
|---|---|---|---|
| 2,287,354 | 6/1942 | Misch | 408/101 |
| 2,899,983 | 8/1959 | Farris | 137/318 |
| 2,972,915 | 2/1961 | Milanovits et al. | 137/318 |
| 3,532,113 | 10/1970 | McKean | 137/318 |
| 3,833,020 | 9/1974 | Smith | 137/318 |
| 3,863,667 | 2/1975 | Ward | 137/318 |
| 4,450,857 | 5/1984 | Baugh et al. | 137/318 |
| 4,552,170 | 11/1985 | Margrave | 137/318 |
| 5,076,311 | 12/1991 | Marschke | 137/318 |
| 5,108,421 | 5/1991 | Lucki et al. | 83/835 |
| 5,152,310 | 10/1992 | O'Bryon | 137/318 |

*Primary Examiner*—George L. Walton
*Attorney, Agent, or Firm*—Robert G. Mentag

[57] ABSTRACT

A valve adapted for insertion in a pressurized fluid flow line for blocking and sealing the flow of fluid through the line without disconnecting the line and to maintain the pressure in the upstream end of the line. The valve includes two body portions which may be clamped on the fluid flow line to form a valve body in which is adjustably mounted an elongated tubular outer shaft, and an elongated cylindrical inner shaft that is rotatably mounted through the tubular outer shaft and carries an annular hole cutter and a tubular seal. The inner shaft is rotatable for driving the annular hole cutter through the line and the outer shaft is rotatable for advancing the inner shaft and annular hole cutter and for positioning the tubular seal in the hole cut through the line to block and seal flow through the downstream portion of the line.

5 Claims, 6 Drawing Sheets

IN-LINE VALVE FOR INSERTION IN A PRESSURIZED FLUID FLOW LINE

BACKGROUND OF THE INVENTION

1. Field of the Invention

The field of art to which this invention pertains may be generally located in the class of devices relating to valves. Class 137, Fluid Handling, Subclass 318 United States Patent Office Classification, appears to be the applicable general area of art to which the subject matter similar to this invention has been classified in the past.

2. Description of the Prior Art

It is necessary in many instances to terminate the flow of fluid through a fluid flow system, such as a gas line or a liquid line, because of a a failure in the fluid flow system due to a leaking valve, a crack in the fluid flow line, or other problems which require the fluid flow system to be shut down to make the required repairs. It is also necessary in many instances, because of required maintenance or changes in a water system, a refrigeration system, an air conditioning system and other fluid flow systems to temporarily shutdown such systems for many hours. Such problems can involve the loss of many work hours, and the closing of buildings containing fluid flow systems wherein the flow of fluid therethrough must be terminated for either a short period or a long period.

Heretofore it has been proposed to provide a valve insertable in a fluid flow line which could be attached to the fluid flow line and which included a hole cutter means for cutting a hole through the fluid flow line and placing a tubular seal in the hole to block the flow of fluid downstream of the blocked hole. Such an in-line insertable valve is disclosed and described in U.S. Pat. No. 5,316,037.

The valve disclosed in U.S. Pat. No. 5,316,037 has proved in use that it is constructed and arranged for efficient insertion into a pressurized fluid flow line comprising copper tubing. However, experience has shown that a heavier duty valve with an improved cutting structural arrangement is preferable when there is a need to insert an in-line valve into a pressurized fluid flow line comprising steel pipe and plastic pipe.

SUMMARY OF THE INVENTION

It is an object of the present invention to provide a novel and improved in-line valve for insertion in a pressurized fluid flow line comprising pipe made from steel and plastic materials without making any disconnection of the fluid flow line to terminate the flow of fluid therethrough and enable downstream repairs or installations on new equipment.

It is another object of the present invention to provide an in-line valve for insertion in a pressurized fluid flow line comprising steel or plastic pipe of sizes from 1¼ inches in diameter to 3 inches in diameter.

The in-line valve for insertion in a pressurized fluid flow line, in accordance with the invention, employs a forged body and associated structure to prevent leakage problems incurred by some prior art valves of this type which are due to the porosity of a cast valve body construction. The valve of the present invention includes an upper body structure and a lower body structure which are adapted to be releasably and sealingly mounted over a fluid flow line. An elongated cylindrical, tubular outer shaft having a threaded periphery is threadably and rotatably mounted in the upper body structure. An elongated solid, smooth faced cylindrical, axial inner shaft is rotatably mounted through the elongated tubular outer shaft, and the lower end of the elongated solid inner shaft extends beyond the lower end of the tubular threaded outer shaft. An annular hole cutter is operatively mounted on the lower end of the elongated solid inner shaft. A tubular seal is operatively mounted on the solid cylindrical inner shaft, with the lower end of the tubular seal in abutment with a steel washer that is seated on the upper end of the annular hole cutter. An O-ring seal carrier is mounted on the solid cylindrical inner shaft that carries the annular hole cutter, in a position with its lower end seated on the upper end of the tubular seal and its upper end seated against steel washer that is seated against the lower end of the outer tubular threaded shaft. A releasable retainer ring is operatively mounted around the upper, outer end of the annular hole cutter inner shaft, to retain the inner shaft against longitudinal movement relative the outer threaded shaft. The inner shaft carrying the annular hole cutter is freely rotatable in the outer threaded shaft. In operation, with the valve of the present invention operatively mounted on a fluid flow line, a hole may be cut through the fluid flow line by rotating the inner shaft at a constant RPM with a suitable tool as for example, a drill. An open end wrench may be mounted on the outer shaft for selectively advancing the annular hole cutter and the tubular seal simultaneously, during a hole cutting operation on the fluid flow line. The simultaneous annular hole cutting action and advancing of the tubular seal continues until the annular hole cutter seats on a stop ring positioned in the lower body structure, and at that time the flow through the fluid flow line will be shut off. The advancing movement of the outer shaft is continued for approximately 1½ additional turns to expand the tubular seal across the two cuts made in the fluid flow line by the annular hole cutter.

DETAILED DESCRIPTION OF THE PREFERRED EMBODIMENT

Figure 1:
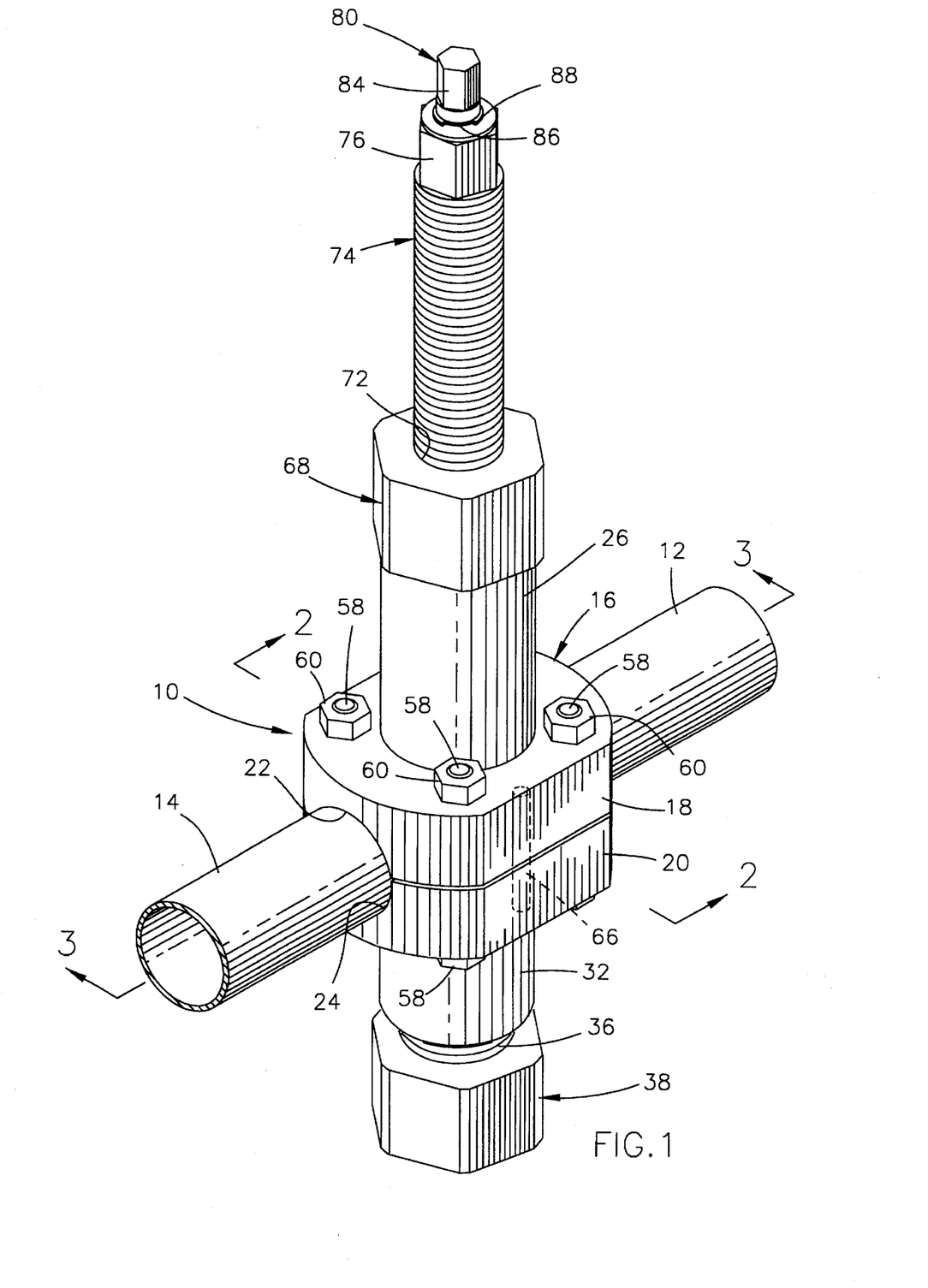
FIG. 1 is an elevation perspective view of the valve of the present invention, and showing the valve mounted on a pressurized fluid flow line.
Figure 2:
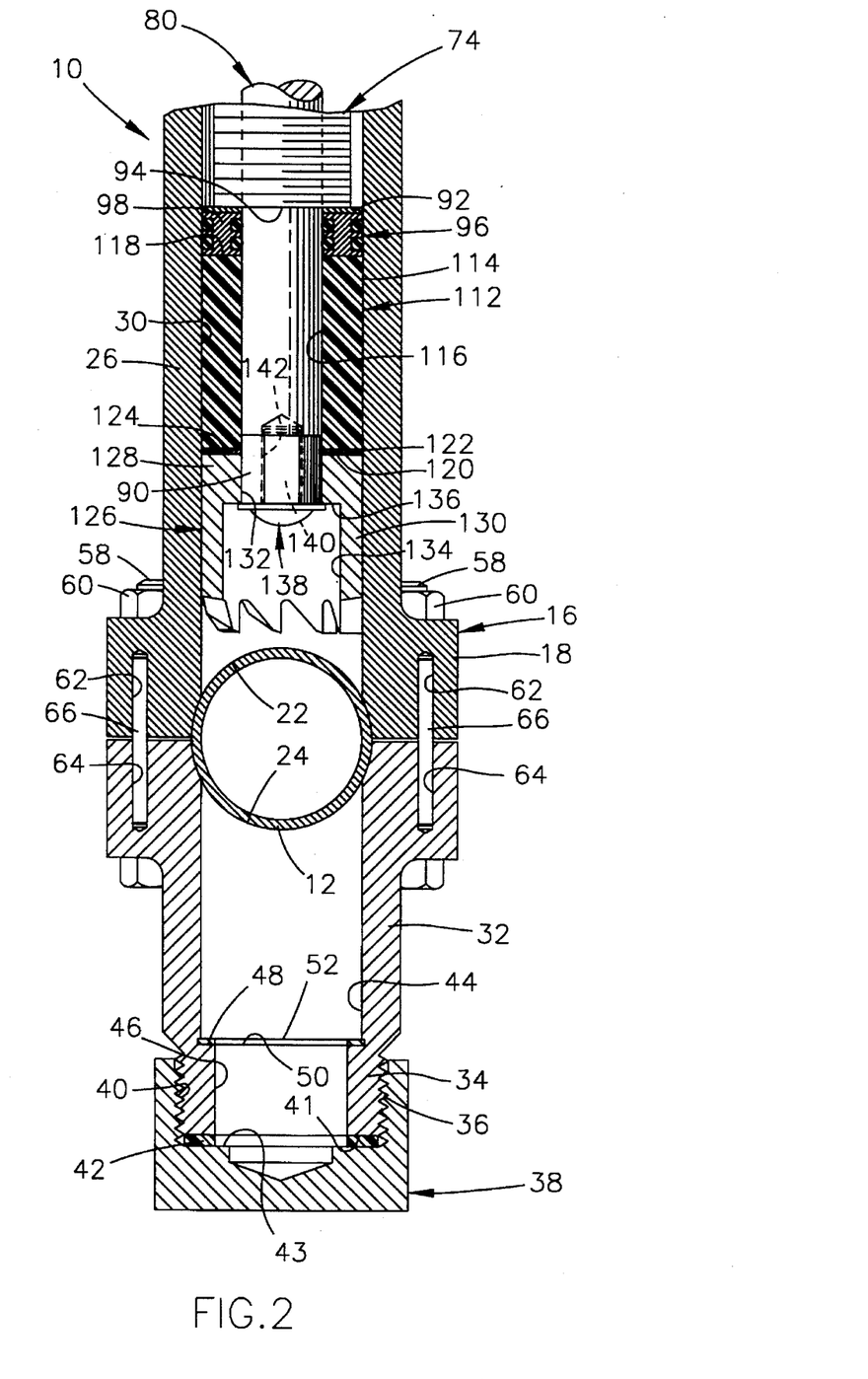
FIG. 2 is an enlarged, partial, elevation section view of the valve and pressurized fluid flow line structure illustrated in FIG. 1, taken along the line 2—2 thereof, looking in the direction of the arrows, and showing the valve shaft in a retracted position.
Figures 3, 4:
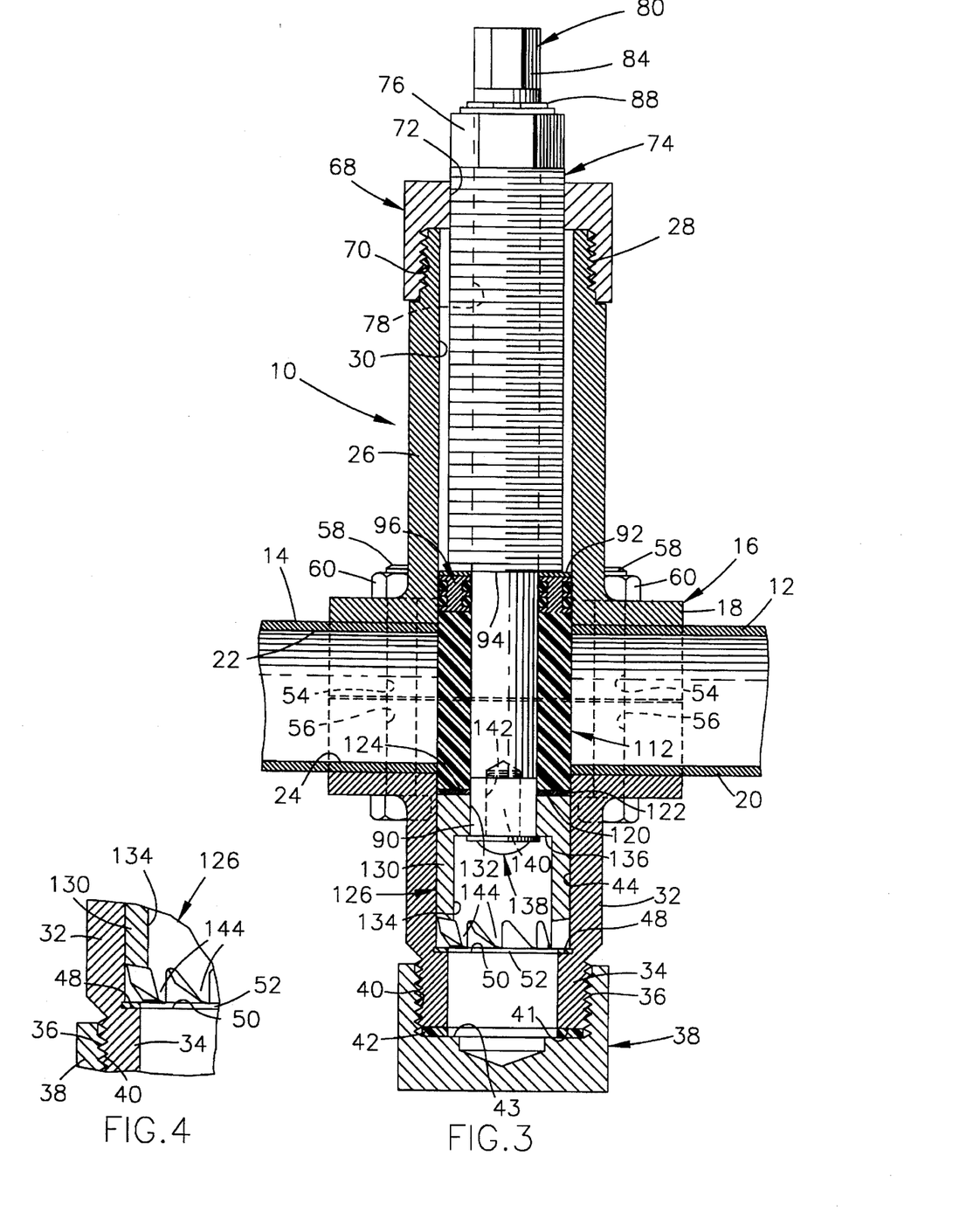
FIG. 3 is an enlarged, elevation section view of the valve structure illustrated in FIG. 1, taken along the line 3—3 thereof, looking in the direction of the arrows, and showing the valve shafts in an advanced position for closing and sealing the flow of fluid through the fluid flow line on which the valve is mounted.
FIG. 4 is an enlarged, fragmentary section view of a lower end structure of FIG. 3.

Referring now to the drawings, and in particular to FIGS. 1, 2 and 3, the reference numeral 10 generally designates a valve made in accordance with the invention and showing the valve mounted on a fluid flow line 12, where it is desired to temporarily terminate a flow of fluid through the downstream end 14 of the line 12.

As shown in FIGS. 1, 2, 3 and 5, the valve 10 is provided with a body, generally indicated by the numeral 16, and which includes an upper body portion 18 and a lower body portion 20. As best seen in FIGS. 1 and 2, the upper and lower body portions 18 and 20, respectively, are provided with longitudinal complementary semicircular bores 22 and and 24, respectively, which extend therethrough. The semicircular bores 22 and 24 are formed to dimensions to receive the outer surface of the fluid flow line 12 so that the valve body 16 engages the fluid flow line 12 with a close fit over the line 12.

Figure 12:
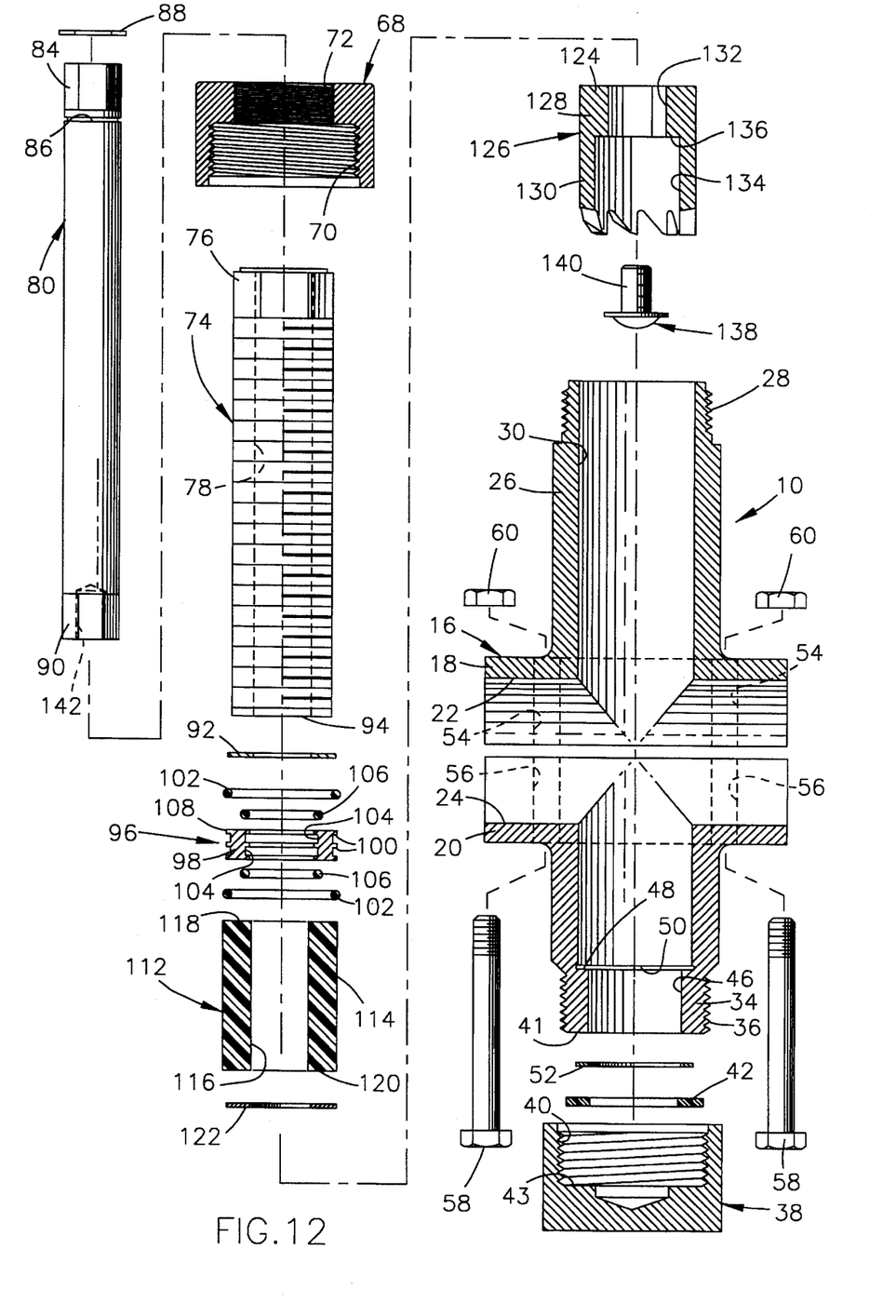
FIG. 12 is an exploded view of the parts of the valve of the present invention, and showing the association of the parts relative to each other.

As best seen in FIGS. 3 and 12, the upper valve body portion 18 is provided with integral, cylindrical extension 26, which extends upwardly as viewed in the drawings, from the top of the upper body portion 18. The upper body integral cylindrical extension 26 is provided with external standard pipe threads 28 at the upper end thereof. The upper body integral cylindrical extension 26 is provided with an axial cylindrical bore 30 which extends axially therethrough from the upper end thereof, and which communicates at the lower end thereof, with the semicircular bore 22 in the upper body portion 18. The central axis of the axial cylindrical bore 30 intersects, and is perpendicular to, the longitudinal or central axis of the cylindrical opening formed between the upper and lower body portions 18 and 20 by the complementary semicircular bores 22 and 24. The diameter of the axial cylindrical bore 30 is smaller than the bore of the cylindrical opening formed by the semicircular bores 22 and 24 and is preferably equal to or slightly larger than the inside diameter of the line 12.

As best seen in FIGS. 4 and 12, the lower body portion 20 is provided with an integral extension 32 which extends downwardly from the central part of the lower body portion 20 and which is provided at the lower end thereof with a reduced diameter portion 34 that is provided with external standard pipe threads 36. A lower cap, generally indicated by the numeral 38 is provided with an internal thread 40 and it is threadably mounted on the external standard pipe threads 36 on the reduced diameter lower body end portion 34. As shown in FIG. 2, a suitable seal 42 is seated against the lower end or transverse face 41 of the reduced diameter lower end portion 34 of the lower body integral cylindrical extension 32. The seal 42 is seated on a seat 43 formed in the lower end cap 38.

As shown in FIG. 2, the integral cylindrical extension 32 on the lower body portion 20 is provided with an axial bore 44 which extends downwardly from the semicircular bore 24 to a radially inward extended annular shoulder 48 formed at the upper end of a reduced diameter axial bore 46 in the reduced diameter lower end portion 34 on the lower body integral extension 32. An annular groove 50 is formed in the lower end of the axial bore 44 and the lower face thereof is parallel to the radial shoulder 48. Releasably mounted in the groove 50 and seated on the shoulder 48 is a snap ring retainer 52. The lower side of the groove 50 is coplanar with the upper surface of the annular shoulder 48. The snap ring retainer 52 is a heavy duty snap ring which is preferably made from a suitable stainless steel material such as 316 stainless steel. The annular shoulder 50 extends radially inward for a preferable distance of from minus 0.0 mm to plus 0.4 mm beyond the inner periphery of the snap ring retainer 52. The bottom cap 38 is a heavy duty forged brass cap with a hexagonal shaped outer periphery for a reception of a wrench for tightening the cap 38 on the lower body extension 32. The sealing washer ring 42 is made from an elastomeric material sold under the trademark "VITON". The owner of the trademark "VITON" is the DuPont Company located at 1007 Market Street, Wilmington, Del. 19898.

An upper body portion 18 with its integral cylindrical extension 26 and the lower body portion 20 with its integral extension 32 comprise heavy duty brass forgings to eliminate the porosity and leakage which is inherent in metal castings. The brass forgings for the upper and lower body portions 18 and 20 are made under pressure of 500 pounds per square inch.

The upper body portion 18 is provided with four bolt holes or bores 54 which are formed vertically through the corners of the upper body portion 18, as shown in FIGS. 1 and 12. The lower body portion 20 is provided with four mating bolt holes or bores 56 which are formed vertically through the corners thereof and disposed in vertical alignment with the bolt holes or bores 54 in the upper body portion 18. A stainless steel machine screw 58 is mounted in each of the pair of aligned vertical machine screw holes or bores 54 and 56, with the threaded end thereof extended upwardly and having mounted thereon a machine screw nut 60.

A cylindrical opening through the upper and lower body portions 18 and 20 for a fluid flow line 12 is formed by the complementary semicircular bores 22 and 24. In the manufacturing of the upper and lower body portions 18 and 20, they are clamped together by the four machine screws 58 and nuts and 60, and a cylindrical reaming tool is passed through the complementary semicircular bores 22 and 24, to ream these bores to a diameter commensurate with whatever size diameter line 12 that the valve being manufactured is to be used, as for example, a ½ inch diameter line, a ¾ inch diameter line, and so forth. The last mentioned reaming operation is performed to provide the bores 22 and 24 with the desired finished circular dimension with a tolerance of plus 0.0 mm or minus 0.3 mm. After the reaming operation of the line bore through the valve 10 has been accomplished, a pair of dowel pin bores 62 are machined upwardly into the upper body portion 18 and a mating and aligned pair of dowel pin bores 64 are machined downwardly into the lower body portion 20, as shown in FIG. 2. A suitable dowel pin 66 is operatively mounted in each of the mating sets of dowel pin bores 62 and 64, to insure alignment of the upper and lower body portions 18 and 20, respectively, when they are assembled on a fluid flow line 12. As shown in FIG. 3, the upper body integral extension 26 has threadably mounted thereon an upper cap, generally indicated by the numeral 68. The upper cap 68 is provided with internal threads 70 which mate with the external threads 28 on the integral upper body extension 26. As shown in FIG. 1, the upper cap 68 is provided with a hexagonal shaped periphery for reception of a wrench for tightening the upper cap 68 on the upper body extension 26. The upper cap 68 is made from the same heavy duty forged brass from which the valve body 16 is made.

As shown in FIGS. 1, 3 and 12, the upper end of the cap 68 is provided with a threaded axial bore 72 for the threaded reception of an elongated tubular, threaded outer stem or shaft, generally indicated by the numeral 74. As shown in FIGS. 1 and 12, the tubular, threaded outer shaft 74 is provided on the upper end thereof with a hexagonal shaped head 76 for the reception of a socket wrench for turning the outer shaft 74. The outer shaft 74 is made from a 216 stainless steel.

The outer shaft 74 is provided with a smooth axial bore 78 which extends completely therethrough, from the upper end to the lower end. The threads on the outer periphery of the outer shaft 74 are of a suitable coarse thread. For example, in one valve made for use on a 1 inch diameter fluid flow line 12, the outer shaft 74 was provided with a ¾ inch outer diameter and with 18 threads per inch. The axial threaded bore 72 in the cap 68 is provided with the same number of threads per inch as is employed on the outer periphery of the outer shaft 74.

Figure 11:
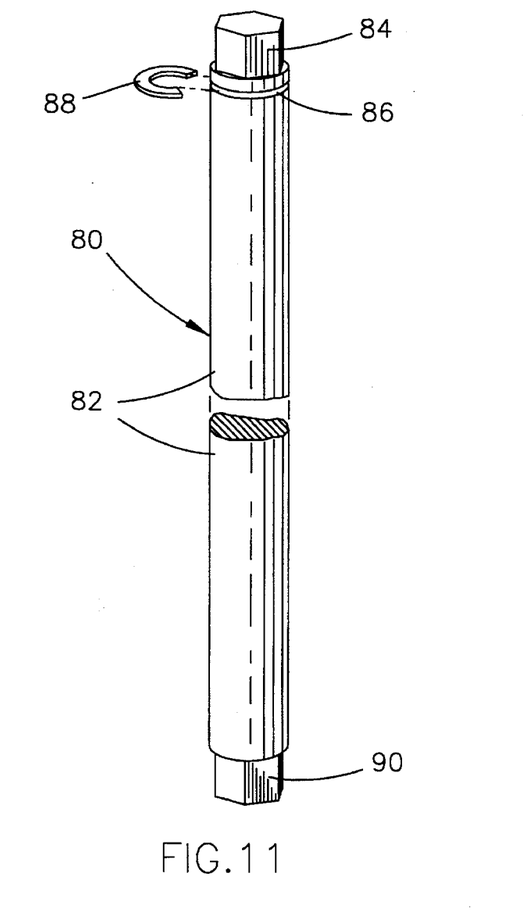
FIG. 11 is an elevation perspective view, partly broken away, and showing the inner solid cylindrical shaft that carries the annular hole cutter.

As shown in FIGS. 1, 2 and 3, an inner shaft, generally indicated by the numeral 80, is slidably and rotatably mounted in the axial bore 78 in the outer tubular shaft 74. As shown in FIG. 11, the inner shaft 80 has a smooth faced, solid cylindrical body 82 and an integral hexagonal shaped head 84 on the upper end thereof. A peripheral groove 86 is formed around the upper end of the inner shaft 80, adjacent the hexagonal shaped head 84. A C-shaped releasable retainer member 88 is adaptable to be releasably mounted in the groove 86. The lower end of the inner shaft 80 is provided with an integral driving end 90 which is hexagonal shaped in cross section.

As shown in FIG. 3 the inner shaft 80 is slidably and rotatably mounted in the axial bore 78 in the outer shaft 74, with the C-shaped releasable retainer member 88 seated against the upper end surface of the outer shaft 74. As illustrated in FIGS. 2 and 3, a flat steel washer 92 is mounted on the cylindrical inner shaft 80 in a position where its upper surface abuts the lower end 94 of the threaded outer shaft 74. The flat steel washer 92 is preferably made from a suitable stainless steel, such as a 316 stainless steel.

Figure 10:
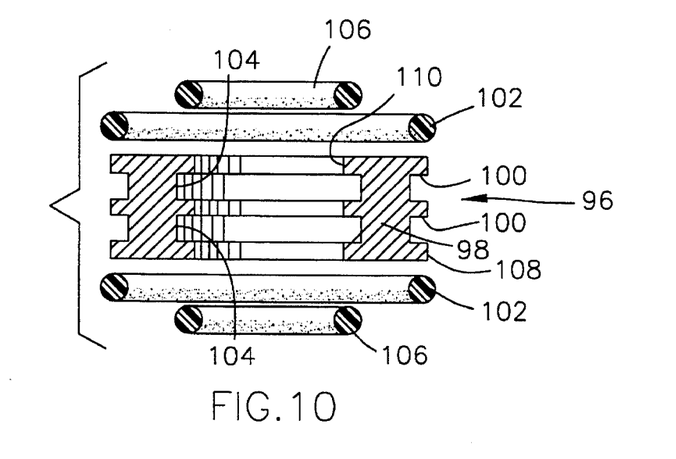
FIG. 10 is an enlarged, exploded section view of the O-ring seal carrier employed in the invention.

Operatively mounted on the smooth cylindrical, lower portion of the inner shaft 80 is an O-ring double seal member, generally indicated by the numeral 96. As shown in FIG. 10, the O-ring double seal member 96 comprises a brass body 98 in the form of a circular washer member. The seal member body 98 is provided with a pair of spaced apart peripheral grooves 100, in each of which is mounted a suitable conventional O-ring 102. The double seal member body 98 is further provided with a pair of internal peripheral grooves 104, in each of which is operatively mounted a suitable conventional O-ring seal 106. The outer periphery of the double seal member body 98 is designated by the numeral 108. The double seal member body 98 is provided with an inner axial bore 110.

Figure 5:
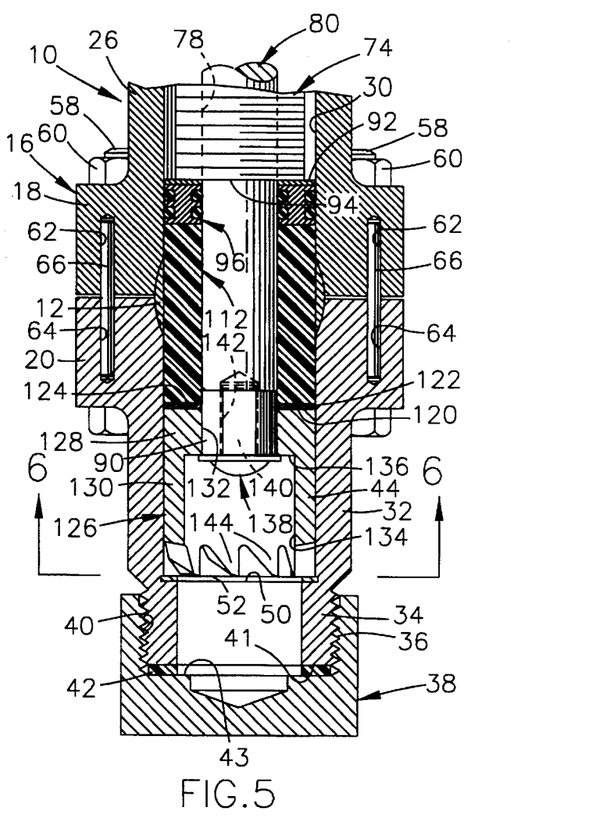
FIG. 5 is a partial, elevation section view of the valve structure illustrated in FIG. 3, and taken at a right angle relative to the structure shown in FIG. 3.
Figure 6:
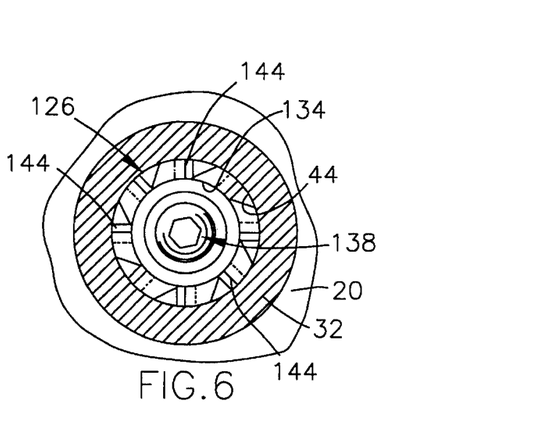
FIG. 6 is a horizontal section view of the valve structure illustrated in FIG. 5, taken along the line 6—6 thereof, and looking in the direction of the arrows.

As shown in FIGS. 2, 3 and 5, the O-ring double seal member 96 is operatively mounted around the inner shaft 80 in a position with its upper end abutting the flat steel washer 92. The outer O-rings 102 sealingly engage the cylindrical surface of the cylindrical axial bore 30 in the valve body upper portion extension 26. The two inner O-rings 106 sealingly engage the peripheral surface of the cylindrical inner shaft 80. The O-rings 102 and 106 are made from an elastomeric material sold under the aforementioned trademark "VITON".

As shown in FIG. 2, a tubular elastomeric seal, generally indicated by the numeral 112, is slidably mounted over the lower end of the cylindrical inner shaft 80, with its upper end 118 abutting the lower side of the O-ring double seal member 96. The numeral 114 designates the outer periphery of the tubular elastomeric seal 112 and it slidably engages the cylindrical bore 30 in the valve body upper portion integral cylindrical extension 26. The numeral 116 designates the inner periphery of the cylindrical axial hole through the tubular elastomeric seal 112 through which is slidably mounted the lower end of the inner shaft 80. The lower end 120 of the tubular elastomeric seal 112 is seated against a steel washer 122 which is mounted around the tubular round inner shaft 80 adjacent the hexagonal shaped driving lower end 90 of the inner shaft 80. The tubular elastomeric seal 112 is made from elastomeric material sold under the aforementioned trademark "VITON".

Figure 7:
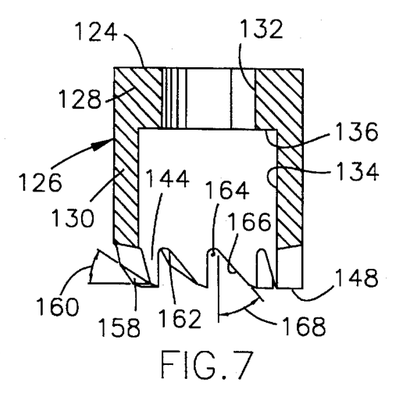
FIG. 7 is an elevation section view of the annular hole cutter employed in the valve of the present invention.

As shown in FIGS. 2, 3 and 5, an annular hole milling cutter, generally indicated by the numeral 126, is operatively mounted on the lower end of the inner shaft 80. As shown in FIG. 7, the annular hole cutter 126 has an upper end surface 124 and a transverse annular head 128. The annular hole cutter 126 is provided with an integral cylindrical wall 130 which extends downwardly from the annular head 128. An axially disposed hole 132, which is hexagonal in cross section shape, is formed through the cutter head 128 and communicates with a cylindrical interior chamber 134 which has an interior upper end wall 136. Said interior cylindrical chamber 126 extends from a lower open end of the cutter 126, upwardly and terminates at the interior cylindrical chamber upper end wall 136.

As shown in FIGS. 2, 3 and 5, the annular hole milling cutter 126 is mounted on the lower hexagonal end 90 of the inner shaft 80 by slidably receiving the shaft lower hexagonal end 90 in the hexagonal shaped axial opening 132 in the head 128 of the annular hole milling cutter 126. The length of the hexagonal end 90 of the inner shaft 80 is longer than the axial length of the hexagonal hole 132 in the head 128 of the annular hole cutter 126 to permit sliding movement of the inner shaft hexagonal end 90, as explained in detail hereinafter during operation and use of the valve 10. The annular hole milling cutter 126 is prevented from moving axially downward off of the inner shaft end 90 by a brass self locking screw generally indicated by the numeral 138. The self locking screw 138 has a self locking screw shaft 140 which is threadably mounted in a blind threaded bore 142 in the lower transverse end of the hexagonal end 90 of the inner shaft 80.

Figure 8:
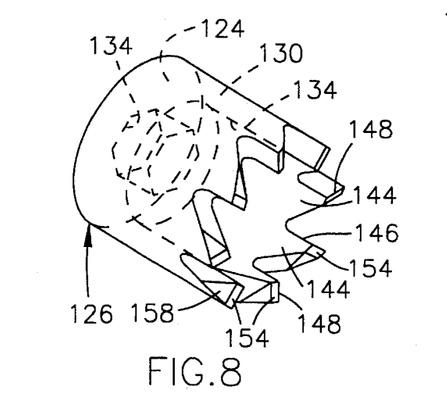
FIG. 8 is an elevation perspective view of the annular hole cutter illustrated in FIG. 7.
Figure 9:
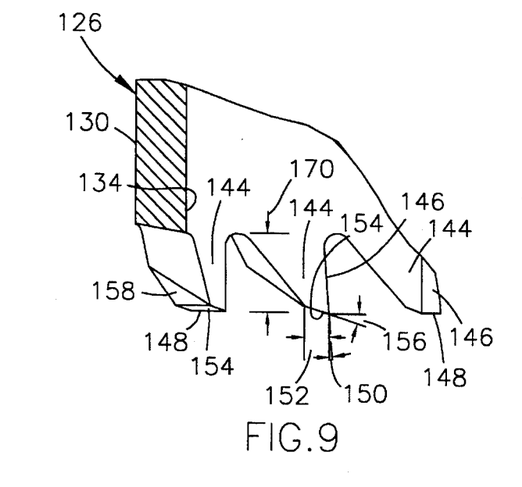
FIG. 9 is a fragmentary, enlarged section view of the lower left end corner of the annular hole cutter structure illustrated in FIG. 7.

The annular hole milling cutter 126 is provided with a plurality of longitudinally extended cutting teeth around the open lower end thereof and these teeth are indicated by the numeral 144 in FIGS. 7, 8 and 9. FIG. 8 shows the cutter 126 as having eight cutting teeth 144. Such a cutter 126 would be used for a valve 10 which would be adapted for use on a line 12 having a diameter of one inch. It will be understood that for each different size diameter line 12 on which a valve 10 would be used that the cutter 126 would have a different number of cutting teeth 144. For example, if the valve 10 is to be used on a ½ inch diameter steel pipe line 12 the preferred number of cutting teeth would be four, on a ¾ inch diameter steel pipe line 12 the preferred number of teeth would be 6, and so forth. As shown in FIGS. 8 and 9, a leading radial face of each of the cutting teeth 144 is indicated by the numeral 146, and the lower edge of the leading radial face 146 forms a cutting edge 148 which is disposed on a radial line passing through the longitudinal axis of the cutter 126. As shown in FIG. 9, the cutting edge 148 of each tooth 144 extends circumferentially forward of the tooth front leading radial face 146 which angles upwardly from the lower end of the cutter 126, and circumferentially rearwardly at an angle indicated by the numeral 150. A preferred angle for the angle 150 is between four and six degrees. The numeral 152 in FIG. 9 designates the circumferential length of the lower end 154 of a cutter tooth 144, and in one embodiment of the cutter for use on a one inch fluid flow line 12, its circumferential length 152 was 0.039 inches.

The back or clearance angle of each cutter tooth 144 is indicated by the numeral 156 and a preferable angle 156 is employed in said one embodiment for use on a one inch steel pipe is 12 degrees, plus or minus 3 degrees.

The numeral 158 in FIG. 7 indicates the outer edge second clearance angle, and the angular value of the second clearance angle 158 is indicated by the numeral 160 in FIG. 7. The angular value 160 of the second clearance angle 158 in the aforementioned embodiment for use on a one inch steel pipe was 30 degrees plus or minus 1 degree, relative to the longitudinal axis of the cutter. As shown in FIG. 7, each of the cutting teeth 144 is provided at the upper end thereof with a concave gullet 162, which is formed as a part of the circular part generated by a radius line from a radius point 164. The radius line in said one embodiment was 1.0 mm with a tolerance of plus 0.5 min. As shown in FIG. 9, one end of the circular arc forming in the concave gullet 162 meets the upper end of the sloping front radial surface 146 of a cutting tooth 144. The other end of the gullet circular arc meets the upper end of an upwardly sloping surface 166, which may be called a flute surface. The lower end of the sloping flute surface 166 terminates at the circumferential rear end of an adjacent cutter tooth lower end 154. The angled flute surface 166 slopes upward from the circumferential rear end of a lower end 154 of a cutter tooth 144 and is formed at an angle indicated by the numeral 168 in FIG. 7, which is preferably an angle of 45 degrees. In said one embodiment for use on a one inch steel pipe fluid flow line 12, the depth of each tooth 144 was 0.098 inches and this depth is indicated by the numeral 170 in FIG. 9.

In said one embodiment for use on a one inch steel pipe fluid flow line 12, the length of the cutter 126 was 1.122 inches, the inner depth was 0.926 inches, the outer diameter was 0.933 inches, and the thickness of the annular hole cutter wall 130 was 0.237 inches. The width of the interior cylindrical chamber 134 of the cutter 126 was 0.696 inches.

The tubular seal 112 is a gum synthetic flourinated copolymer 90-shore hardness available from the aforementioned Du Pont Company under the trademark "VITON" type A. The tubular seal 112 functions to provide a seal member which will deflect radially outward in response to axial compressive forces applied to the seal ends 118 and 120.

In use, the valve 10 may be installed on a steel or plastic pipe 12 without shutting off the fluid in a building distribution piping system. A suitable wrench is mounted on the upper hexagonal end 76 of the outer tubular shaft 74 to rotate the shaft 74 in a counter-clockwise direction to retract the cutter 126 to a position shown in FIG. 2, wherein it is in a position above a fluid flow line 12 on which the valve 10 is to be mounted. The valve body 16 is disassembled by removing the four bolts 58. The surface of the fluid flow line 12 is then cleaned thoroughly with a wire brush.

A medium coat of a suitable fluid sealant, such as a gasket sealant available from Jomar International, Ltd., 31831 Sherman Drive, Madison Heights, Mich. 48071, under the trademark "TIGHTER-THAN-TITE", is brushed on the curved and flat surfaces of the valve body upper and lower portions 18 and 20. After the suitable sealant air dries for approximately five minutes, the valve 10 is assembled around the fluid flow line 12. The valve body upper and lower portions 18 and 20 are positioned on the fluid flow line 12 and the four mounting bolts 58 and nuts 60 are applied and the nuts 60 are tightened evenly to a maximum torque to align the valve body 16 evenly on both sides of the valve 10.

Preferably, a variable speed drill motor is operatively attached to the hexagonal upper end 84 of the inner shaft 80 so as to rotate the center or inner stem or shaft 80 at a steady rate of revolutions per minute. An open end wrench is mounted on the hexagonal upper end 76 of the outer tubular shaft 74 for manually rotating the outer tubular shaft 74 consistently ahead of the drilling action by the inner shaft 80 to feed the cutter 126 into the pipe 12. The inward advancement, in a clockwise direction of the outer tubular shaft 74 may be carried out by a medium wrist action, so as to consistently move the outer shaft 74 slightly ahead of the drilling action being carried out by the inner shaft 80. It will be seen that the employment of the outer tubular shaft 74 and the separate independent rotatable inner shaft 80, which carries the annular hole cutter 126, splits the function of the turning of the annular hole cutter 26 from the inward feeding of the annular hole cutter 126 and the tubular elastomeric seal 112.

It will be understood that the inner shaft 80 carrying the annular hole cutter 126 may be rotated manually by the use of suitable wrench. However, it has been found that by rotating the inner shaft 80 at a constant speed of about 700 revolutions per minutes, that the outer tubular shaft 74 may be easily moved inward because of the rapid cutting action which occurs if the inner shaft 80 is rotated by a power tool.

Continuous rotation of the inner shaft 80, and the selective feeding rotation of the outer shaft 74 will move the annular hole cutter 126 downwardly to cut through the upper wall of a fluid flow line 12. The material or slug cut from the upper wall of the fluid flow line 12 is caught and held in the interior holding cylindrical chamber 134 in the annular hole cutter 126 while the cutter 126 continues to be advanced until cutting teeth 144 have cut through the lower wall of a fluid flow line 12, at which point there will be an apparent sudden release of drill pressure. At this point the drill is released from the inner shaft 80 and a suitable wrench is mounted on the upper hexagonal shaped end 76 of the outer shaft 74 and the outer shaft 74 is then manually rotated downward until the annular hole cutter is moved downwardly into engagement with the snap ring retainer stop member 52. Continued advancing rotation of the outer shaft 74, after the annular hole cutter 126 has engaged the stop member 52, drives the lower hexagonal shaped end 90 of the inner shaft 80 downwardly through the hexagonal opening 132 in the stationary annular hole cutter 126, resulting in an axial compression of the tubular seal 112 between the steel washers 92 and 122. The tubular seal 112 is thus caused to expand radially into a sealing engagement with the circular opening formed through the line 12 and provides a 360 degree seal vertically around said opening, and flow through the line 12 is terminated.

When the tubular seal 112 has been moved into the aforementioned sealing position in the line 12, the lower cap 38 may be removed to permit removal, of the chips and the two separate portions or slugs from the line 12, from the interior of the cutter 126 and the interior of the bottom cap 38. The bottom cap 38 is then mounted again on the valve body lower portion 20 and any necessary downstream repairs or modifications on the line 12 may be accomplished. When the repairs to the downstream side 14 of the line 12 are completed, the outer shaft 74 may be rotated in the reverse direction to retract the annular hole cutter 126 and release the axial compression on the tubular seal 112, and the tubular seal 112 and the cutter 126 may be retracted upwardly into the upper axial bore 30 in the upper body portion 18 to permit normal fluid flow again through the line 12. The valve 10 may be left permanently in place on the line 12 and can be used as a shutoff valve, if desired.

What is claimed is:

1. A valve (10) for insertion in a fluid flow line (12) comprising:

(a) a valve body (16) including an upper body portion (18) and a lower body portion (20);

(b) said upper body portion (18) having a longitudinal semicircular bore (22) on the lower side thereof, and said lower body portion (20) having a longitudinal semicircular bore (24) on the upper side thereof which is complementary with the longitudinal semicircular bore (22) on the upper body portion (18) to form a cylindrical line opening for the reception of a cylindrical fluid flow line (12);

(c) means (58,60) for releasably and sealingly clamping the upper (18) and lower (20) body portions over a fluid flow line (12) mounted in said cylindrical line opening;

(d) said upper body portion (18) being provided with an integral cylindrical extension (26) which extends upwardly from the top of the upper body portion (18), and which has an upper end with external threads (28) formed around the outer periphery thereof, and an axial cylindrical bore (30) that extends therethrough and communicates at the lower end thereof with the semicircular bore (22) in the upper body portion (18) and is perpendicular to said cylindrical line opening;

(e) said lower body portion (20) being provided with an integral cylindrical extension (32) which extends downwardly from the bottom of the lower body portion (20), and which has a lower reduced diameter end (34) with external threads (36) formed around the outer periphery thereof, and a lower end transverse face (41), and an axial stepped diameter bore (44,46) with a cylindrical wall that extends therethrough and communicates at the upper end thereof with the semicircular bore (24) in the lower body portion (20) and is perpendicular to said cylindrical line opening and in axial alignment with the cylindrical bore (30) in said upper body portion (18);

(f) said axial stepped bore (44,46) in the lower body integral cylindrical extension (32) including an upper portion (44) having a first diameter equal to the diameter of the axial cylindrical bore (30) in the upper integral cylindrical extension (26), and a lower portion (46) having a second diameter of a size smaller than said first diameter so as to form an annular, radially inward extended shoulder (48) at a junction point between said bore upper portion (44) and said bore lower portion (46);

(g) said lower body integral cylindrical extension (32) being provided with an annular groove (50) formed in the wall of the stepped diameter bore upper portion (44) at said junction point, and with the lower side of the annular groove (50) being coplanar with the annular surface of the annular shoulder (48), and having a snap ring stop retainer (52) mounted in said annular groove (50);

(h) said lower body portion lower reduced diameter end (34) being provided with a bottom cap (38) which is threadably mounted on the lower end threaded periphery (36) of the lower body portion cylindrical extension lower reduced diameter end (34) and having a transverse seat (43) on the inner side of which is mounted a sealing washer ring (42) that sealingly seats against the lower body portion cylindrical extension lower reduced diameter end transverse face (41);

(i) said upper body portion (18) being provided with an upper cap (68) threadably mounted on the upper end threaded periphery (28) of the upper body portion integral cylindrical extension (26) and having an axial threaded bore (72) formed therethrough;

(j) an elongated tubular outer shaft (74) having an axial bore (78) formed therethrough from an upper end to a lower end, and having an outer threaded periphery, and a hexagonal shaped head, and being is threadably mounted through the axial threaded bore (72) in the upper body cap 68;

(k) an elongated inner shaft (80) having a smooth surface cylindrical shape, with an upper hexagonal shaped driver head (84) on the upper end thereof, and a lower end (90) which is hexagonal shaped in cross section and which has a threaded axial blind bore (142) extended upwardly therein from the lower end thereof;

(l) said elongated inner shaft (80) being mounted through the axial bore (78) in said elongated tubular outer shaft (74) and being freely rotatable therein, and having the lower portion thereof extended below the lower end of the elongated tubular outer shaft (74), and retainer means (88) mounted on the upper end of the elongated inner shaft (80) and engaging the upper end of the elongated outer shaft (74) to limit the inward movement of the elongated inner shaft (80) relative to the elongated tubular outer shaft (74);

(m) a steel washer (92) mounted around the elongated inner shaft (80) lower portion with an upper side thereof seated against the lower end of the elongated tubular outer shaft (74);

(n) an O-ring seal carrier member (96) mounted around the elongated inner shaft (80) lower portion below the steel washer (92), with an upper side thereof seated against the steel washer (92) and having outer O-ring seal means (102) slidably and sealingly engaging the axial cylindrical bore (30) in the upper body cylindrical extension (26), and having an internal O-ring seal means (106) sealingly engaging the periphery of the smooth surface cylindrical shape of the elongated inner shaft (80);

(o) a tubular elastomeric fluid flow line seal (112) is slidably mounted on the elongated inner shaft (80) with an upper end thereof (118) seated against the O-ring seal carrier member (96) and which has a cylindrical outer surface that makes a slip fit within the axial cylindrical bore (30) in the upper body cylindrical extension (26);

(p) a steel washer (122) is mounted around the elongated inner shaft (80) in a position against a lower end (120) of the tubular line seal (112);

(q) an annular hole cutter (126), having a cylindrical head (128) and an integral tubular cylindrical wall (130)

extending downwardly from said head (128), is slidably mounted in the axial cylindrical bore (30) in the upper body portion cylindrical extension (26) and provided with an axially disposed hole (132) formed through said cylindrical head (128) which is hexagonal shaped in cross section and in which is received the hexagonal shaped driving end (90) of the elongated inner shaft (80) and said annular hole cutter (126) is retained on said hexagonal shaped driving shaft end (90) in seating engagement against a steel washer (122) that seats on the lower end (120) of the fluid flow line seal (112) by a self-locking screw (138) operatively mounted in the threaded blind bore (142) in the elongated inner shaft driving end (90);

(r) said annular hole cutter (126) is provided on the lower end of the tubular cylinder wall (130) with a plurality of downwardly extended cutting teeth (144) to provide the cutter (126) with a lower open end and an internal holding chamber (134) for holding a slug cut from the upper wall of a fluid flow line (12) on which the valve (10) is operatively mounted; and, (s) whereby when the elongated tubular outer shaft (74) is rotated in one direction to retract the cutter (126) and the tubular seal (112) upwardly into the cylindrical bore (30) in the upper body extension (26) the upper and lower body portions (18, 20) may be clamped onto a fluid flow line (12), and when the elongated outer shaft (74) is selectively rotated in the opposite advancing direction and the elongated inner shaft (80) is rotated progressively ahead of the outer shaft (74); in said opposite direction independently of the elongated outer shaft (74), the annular hole cutter (126) and the tubular seal (112) will move downwardly sequentially, and the cutter (126) will cut a hole through the upper wall of the fluid flow line (12) and remove a slug which will pass upwardly into the holding chamber (134) in the cutter (126), and continued selective advancing rotation of the outer tubular shaft (74) and the progressive independent rotation of the cutter (126) will move the cutter (126) into a cutting engagement with the lower wall of the fluid flow line (12) and cut a hole therethrough, and further continued selective advancing rotation of the elongated tubular outer shaft (74) moves the tubular seal (112) into the holes cut through the fluid flow line (12) and the cutter (126) will rotate freely within the outer shaft (74) until the cutter (126) is moved to a stopped position against a snap ring stop member (52) to permit the hexagonal shaped lower end (90) of the elongated inner shaft (80) to slide downwardly through the hexagonal opening (132) in the head (128) of the cutter (126), after the cutter (126) has engaged said stop member (52), to permit the lower end of the elongated tubular outer shaft (74) to force said O-ring seal member (96) into engagement with the tubular seal (112) to create an axial compression on the tubular seal (112) and expand it radially outward against the surrounding surfaces of the holes cut through the upper and lower walls of the fluid flow line (12) to block and seal fluid flow through said line (12).

2. A valve (10) for insertion in a fluid flow line (12) as defined in claim 1, wherein:

(a) each of the cutting teeth (144) is provided with a cutting edge (148) which is disposed on a radial line passing through the longitudinal axis of the cutter (126), and the cutting edge (148) of each tooth (144) extends circumferentially forward of the tooth front radial face (146) which angles upwardly from the lower end (154) of the cutter (126) and circumferentially rearwardly at an angle (150) between 4 and 6 degrees, each of the cutting teeth (144) being provided with a circumferential rearwardly extended back angle (156), and an outer edge clearance angle (160) and each of the cutting teeth (144) being provided at the upper end thereof with a concave gullet (166).

3. A valve (10) for insertion in a fluid flow line (12) as defined in claim 1, wherein:

(a) said O-ring seal carrier member (96) includes a pair of outer peripheral longitudinally spaced apart O-ring seals (102); and, (b) a pair of inner peripheral longitudinally spaced apart O-ring seals (106).

4. A valve (10) for insertion in a fluid flow line (12) as defined in claim 1, wherein:

(a) the cutter snap ring retainer stop member (52) is located in the valve body lower portion extension (32) in a position spaced apart upwardly form the lower cap (34).

5. A valve (10) for insertion in a fluid flow line (12) as defined in claim 1, wherein:

(a) said valve body upper and lower portions (18,20) are aligned together in an assembled position by a pair of dowel pins (66).

* * * * *

UNITED STATES PATENT AND TRADEMARK OFFICE
CERTIFICATE OF CORRECTION

PATENT NO. : 5,483,990
DATED : January 16, 1996
INVENTOR(S) : Joseph R. Martin

It is certified that error appears in the above-indentified patent and that said Letters Patent is hereby corrected as shown below:

Column 5, line 14, "216" should be --3216--.

Signed and Sealed this

Fourteenth Day of May, 1996

Attest:

BRUCE LEHMAN

*Attesting Officer*     *Commissioner of Patents and Trademarks*